Figure 1:
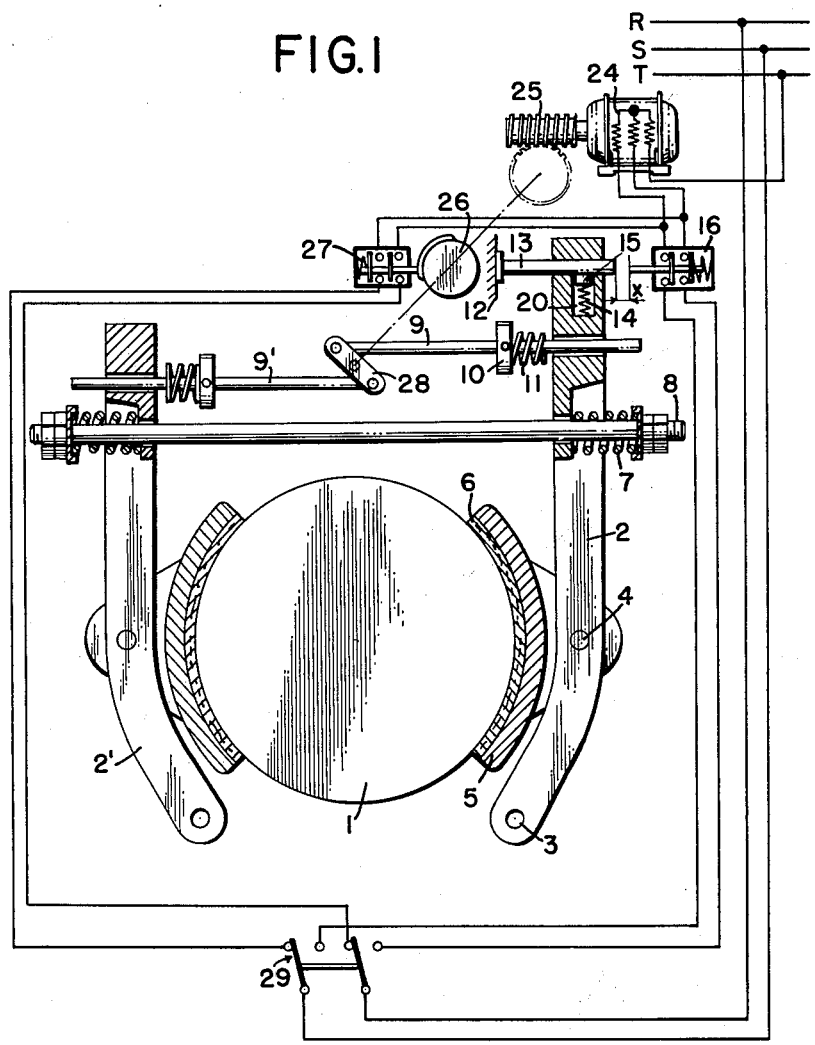

Jan. 22, 1963 R. KÖHLI 3,074,517
ADJUSTMENT DEVICE FOR ELECTRO-MECHANICAL BRAKES
Filed Aug. 31, 1960 3 Sheets-Sheet 1

INVENTOR
ROLAND KÖHLI

BY

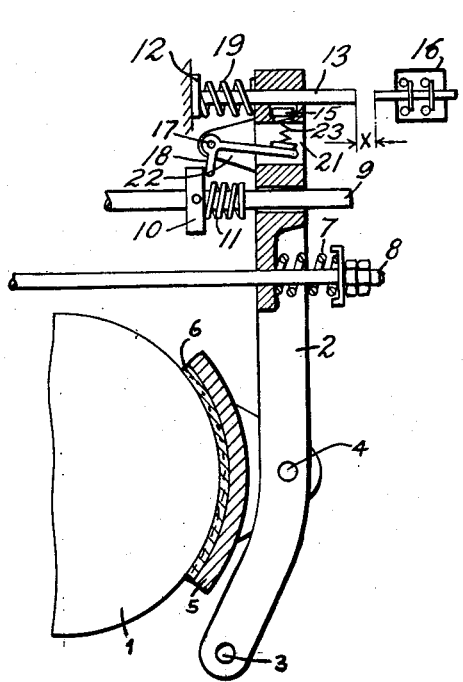

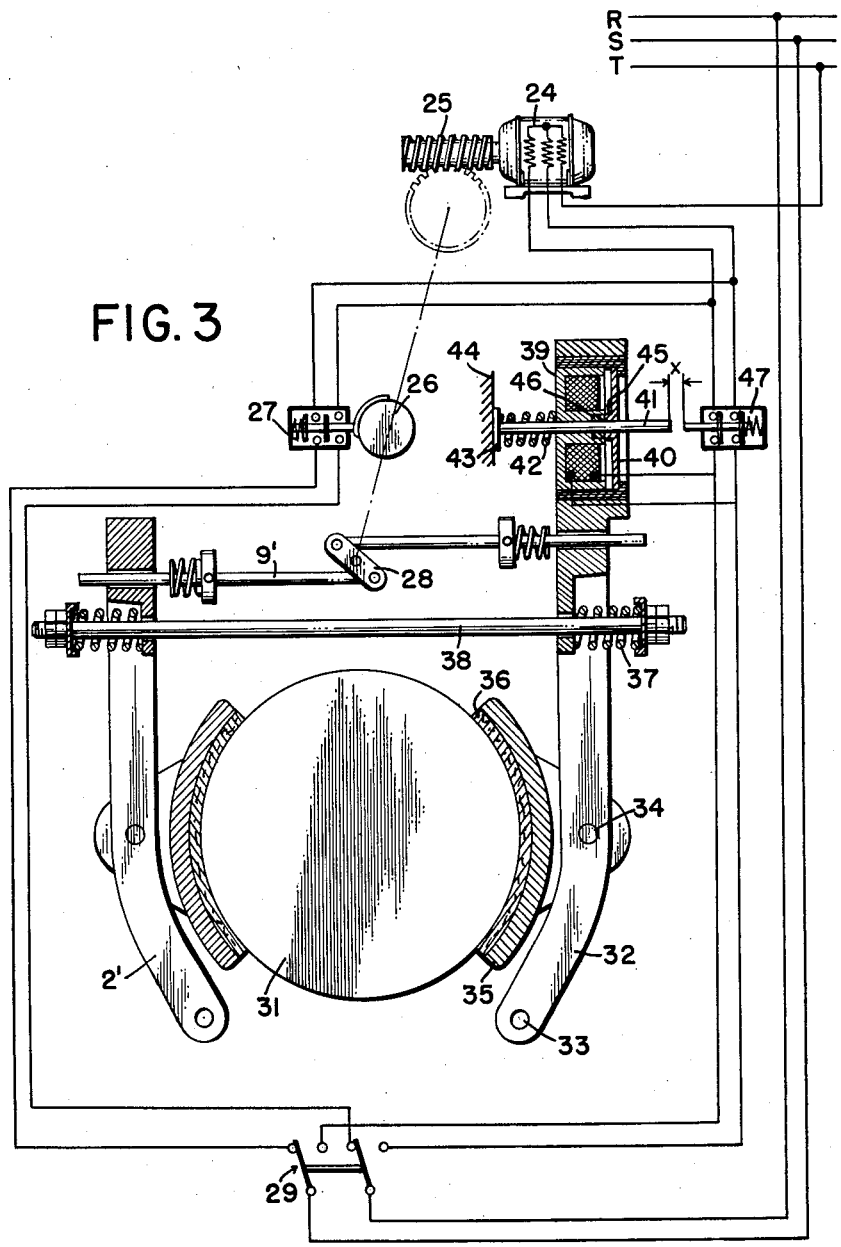

3,074,517
ADJUSTMENT DEVICE FOR ELECTRO-
MECHANICAL BRAKES
Roland Köhli, Bergstrasse 6, Lucerne, Switzerland
Filed Aug. 31, 1960, Ser. No. 53,167
Claims priority, application Switzerland Sept. 2, 1959
10 Claims. (Cl. 188—171)

The present invention relates to an adjustment device for electro-mechanical brakes in which a reversible brake-release motor is switched on in one direction when the brake is disengaged and in the other direction when the brake is applied, but is switched off when the brake is fully opened or closed. With such a brake, switching off of the brake-release motor is effected by limit switches the position of which is dependent on the desired extent of movement of the brake-release rod.

Devices are already known in which wear on the brake linings is automatically compensated for by mechanical means through adjustment of the brake-release rod. These devices have the disadvantage however that the mechanism of adjustment is at least temporarily under the influence of the braking forces, and must therefore be of correspondingly robust design. In addition, there are the familiar devices using a pawl mechanism, in which automatic adjustment takes place only when a certain degree of wear has been exceeded, that is, adjustment is not effected continuously.

The adjusting appliance for electro-mechanical brakes in accordance with the present invention is characterised by the use of a limit switch for stopping the disengaging movement of the brake-release motor. The limit switch is operated by a part which is frictionally connected to the brake lever, and which is in contact with a fixed stop in the closed position of the brake, its position being changed in relation to the brake lever by the friction being overcome, as the brake lining becomes worn. This makes only small adjustment forces necessary so that the device may be of light construction. In addition, adjustment is effected continuously as wear on brake linings takes place.

In accordance with the form of construction of the appliance, which is preferred, not only is adjustment effected in proportion to the wear on the brake lining, but changes in diameter of the brake drum, due to the heating and cooling of the latter, are continuously compensated.

The invention will now be described further, by way of example only, with reference to the accompanying drawings illustrating several embodiments thereof and in which:

FIG. 1 shows a first design for an adjustment appliance to compensate for brake lining wear, and FIGS. 2 to 5 each show alternatives in which, in addition to brake lining wear, compensation is made for any change in diameter of the brake drum consequent upon heating or cooling thereof.

The appliance in accordance with the first design comprises a brake drum 1 which works in conjunction with a brake lever 2 fitted with a brake shoe 5 and a brake lining 6.

The brake lever 2 is supported by and free to pivot about a fixed pin 3, whilst the brake shoe 5 is attached to the lever 2 by a bolt 4. The braking pressure is applied to the brake lever 2 by means of a spring 7 and a pullrod 8. A brake-release motor 24 is provided for releasing the brake. The motor disengages the brake shoe 5 from the brake drum 1 through a pushrod 9, an adjustable collar 10 and an intermediate spring 11. By reference 12 is indicated a fixed stop against which a bolt 13 presses when the brake is engaged. The bolt 13 is supported in a transverse hole in the brake lever 2 so that it is free to slide whilst a compression spring 14 disposed in a recess 20 connected to the transverse hole in the brake lever 2 abuts the bolt 13 via a stud 15, and thus forms a friction connection between the brake lever 2 and the bolt 13. In addition, a double-pole limit switch 16 is arranged in the path of the bolt 13 and serves to switch off the brake-release motor on completion of the latter's disengaging movement.

The device described functions as follows:

When the brake is disengaged, the brake lever 2 carries the bolt 13 with it. The bolt 13 actuates the limit switch 16, which stops the disengaging motion of the brake-release motor. It is assumed, of course, that the bolt 13 does not slide in the hole in the brake lever 2 when carrying out this movement. When the brake linings have worn down a little, the bolt 13 presses against the fixed stop 12 when the brake is engaged, and is therefore moved to the right in the brake lever 2 by a distance corresponding to the amount of wear. As a result of this change in position, the opening distance or stroke of the lever 2 remains constant in spite of the wear which has taken place on the brake lining.

Another form of the invention is shown in FIG. 2. The same parts are provided with the same reference numbers as in FIG. 1. The brake lever 2 has a recess 21 at the end remote from the pivoting pin 3. Adjacent the recess 21 is mounted a bell crank lever 18 said lever 18 being mounted on a holder 22 and being free to pivot round a bolt 17, the shorter arm of the bell crank lever 18 being in contact with the adjustable collar 10 of the pushrod 9. The longer arm of the lever 18 enters the recess 21 and actuates a spring 23 which also works in conjunction with the stud 15. When the brake is disengaged, the bell crank lever 18 is moved, on one side, by the adjustable collar 10 and, on the other, presses the stud 15 on to the bolt 13 through the compression spring 23. A compression spring 19 is constantly endeavoring to push the bolt against the fixed stop 12.

The device just described functions as follows:

When the brake is disengaged initially the intermediate spring 11 is compressed without the brake lever 2 moving. At the same time, the bell crank lever 18 exercises pressure, through the compression spring 23 and the stud 15, on the bolt 13 and holds the latter firmly in the brake lever 2. The brake is released and after the mechanism has traversed the opening distance or stroke, the limit switch 16 breaks the circuit of the brake-release motor. When the brake lining is worn, this appliance works similarly to the first design shown in FIG. 1. If the brake drum 1 was expanded however the bolt 13, gripped in the hole in the brake lever 2, would not come into contact with the fixed stop 12. On release of the spring 11 the bolt 13 is freed due to the release of the compression spring 23, whereupon the bolt 13 is pressed by the spring 19 against the fixed stop 12. As a result of this, the opening distance or stroke X always remains the same irrespective of the wear of the brake linings and of the charges in diameter of the brake drum due to variations in temperature.

In the embodiment of the invention shown in FIG. 3 the adjustment device comprises a brake drum 31 working in conjunction with a brake lever 32 fitted with a brake shoe 35 and lining 36. The brake lever 32 is supported by and free to pivot about a fixed pin 33, whilst the brake shoe 35 is secured to the lever by a bolt 34. The braking pressure is applied to the brake lever 32 by a spring 37 and a pullrod 38. A brake-release motor 24 is provided for disengaging the brake.

At the end of the brake lever 32 remote from the pin 33, an electro magnet 39 with an armature 40 is provided through which passes a bolt 41, the bolt being free to slide easily through the armature. A spiral spring 42 is fitted round the bolt 41 one end of said spring bearing on the magnet 39 and the other end on a setting disc 43 attached to the bolt 41. The spring 42 urges the bolt 41 against a fixed stop 44.

The armature 40 is provided with a cylindrical guide bush 45 in its centre, which slides into a corresponding recess in the magnet 39. In this recess is a plastic composition 46 which is compressed when the armature 40 moves from right to left. The plastic composition thus constitutes a chuck which grips or releases the switch operating bolt 41 responsive to movement of the armature 40. At 47 are shown limit switches situated in the path along which the bolt 41 moves, and these serve to switch off the brake-release motor (not shown) on completion of its disengaging stroke.

The device described operates as follows:

When the brake is disengaged, the magnet 39 is energized, the armature 40 is attracted and the compressed plastic composition grips the bolt 41 (otherwise free to slide) in position. On completion of the brake disengaging movement, the operation of the brake-release motor is stopped by the contacts 47. When the brake linings are worn, engagement of the brake results in the bolt 41 coming into contact with the fixed stop 44 and being moved to the right in the brake lever 32 for a distance corresponding to the wear of the brake lining. As a result of this movement, the opening stroke X remains constant irrespective of wear of the brake lining and of changes in diameter of the brake drum due to variations in temperature.

FIG. 4 shows a further form which the invention may take. The same parts have the same reference numbers as in FIG. 3. In this design a stationary magnet 39 is provided with an armature 40 which does not move with the brake lever 32. The arrangement is such that when the brake is released, the magnet 39 is switched on and the bolt 41 clamped in position. A limit switch 48 with contacts 49 and contact pin 50 is connected to the brake lever 32, so that the contact pin works in conjunction with a beveled surface 51 on the bolt 41.

When the brake is released, the magnet 39 is energized and the bolt 41 gripped in the same way as in the arrangement shown in FIG. 3. On completion of the disengaging movement, the contact pin 50 is pushed by the bevelled surface 51, and the contacts 49 broken. The brake-release motor is thus switched off. Adjustment of the brake takes place immediately after a braking process. The bolt 41 held in the magnet 39 enters the de-energized magnet to a greater or less extent according to the wear of the brake lining, through the action of the spring 51', until the bevelled surface 51 touches the contact pin 50, and is gripped in that position when the brake is disengaged.

In conclusion, a last form which the invention may take is shown in FIG. 5. The same parts have the same reference numbers as in FIGS. 3 and 4.

In this design, a stationary magnet 39 with an armature 40 is provided in which one end of a bolt 52 bent at right angles at 57 is supported in the manner described. The bolt 52 also passes through the brake lever 32, in which are housed contacts 53, being free to slide therein. These contacts are actuated by a contact pin 54. Through the action of a strong spring 55, the contact pin 54 is held in the closed position whilst a weaker spring 56 presses the turned up end 57 of the bolt 52 against the contact pin 54. The magnet 39 is energized before the disengaging movement of the brake. The bolt 52 is then gripped and held in position, which prevents the contact pin 54 from being displaced. The pivoting of the brake lever 32 causes the contacts 53 to be moved away and switches off the brake-release motor. The magnet 39 is de-energized only when the closing movement is completed.

What I claim is:

1. In an electromechanical brake arrangement, in combination, brake lever means;
an electric motor operatively connected to said lever means for actuating movement thereof between a brake applying position and a brake releasing position;
a limit switch in circuit with said motor;
a switch operating member;
fastening means for frictionally securing said operating member to said lever means for joint movement therewith, said operating member being engageable with said limit switch for stopping said motor when said lever means moves from a first one to the second one of said positions thereof; and
a fixed stop arranged in fixed spatial relationship to said limit switch for abutting engagement with said switch operating member when said brake lever means moves from said second to said first position thereof.

2. In an arrangement as set forth in claim 1, said switch operating member being elongated in the direction of joint movement thereof with said lever means, and said lever means being formed with a recess receiving said operating member for longitudinal sliding movement.

3. In an arrangement as set forth in claim 2, said fastening means including resilient means permanently urging said operating member into frictional contact with said lever means in a direction transverse of the direction of elongation thereof.

4. In an arrangement as set forth in claim 3, said resilient means including a spring member in simultaneous abutting engagement with said operating member and a portion of said lever means.

5. In an arrangement as set forth in claim 2, motion transmitting means interposed between said motor and said lever means for actuating movement of said lever means when said motor operates, said fastening means including a lever member pivotally mounted on said brake lever means and engaging said motion transmitting means for pivotal movement of said lever member when said motor operates to actuate movement of said brake lever means from one to the other one of said positions of said brake lever means, and a pressure member responsive to said pivotal movement of said lever member for urging said switch operating member into frictional engagement with said brake lever means.

6. In an arrangement as set forth in claim 5, spring means for urging said switch operating member to move in a direction toward said fixed stop, the urging force of said spring means being smaller than the urging force of said pressure member.

7. In an arrangement as set forth in claim 1, said fastening means including an electromagnet, an armature reciprocally movable when said electromagnet is energized and deenergized, and chuck means responsive to the movement of said armature for gripping and releasing said switch operating member.

8. In an arrangement as set forth in claim 7, said electromagnet and said armature being mounted on said brake lever means for joint movement therewith.

9. In an electromechanical brake arrangement, in combination, supporting means;
brake lever means mounted on said support means;
an electric motor operatively connected to said lever means for actuating movement of the latter relative to said support means between a brake applying position and a brake releasing position; a limit switch in circuit with said motor and operable to stop the same, whereby movement of said brake lever means is stopped;
a switch operating member, said member and said limit switch constituting the elements of a switch arrangement, said elements being mounted on respective ones of said means and engageable with each other for stopping said motor when said elements reach a predetermined relative position during movement of said brake lever means from a first to the second one of said positions thereof; and abutment means in fixed spatial relationship to one of said elements for moving the other element relative to the respective one of said means on which said other element is mounted to a fixed distance from said predetermined position relative to the one element when said brake lever means moves from said second to said first position thereof.

10. In an arrangement as set forth in claim 9, an electromagnet mounted on said support means; an armature reciprocally movable when said electromagnet is energized and deenergized; chuck means responsive to the movement of said armature for gripping and releasing said switch operating member; means for energizing said electromagnet when said brake lever means moves from said brake applying position toward said brake releasing position thereof, and for deenergizing said electromagnet when said brake lever means moves from said brake releasing position toward said brake aplying position, said limit switch being mounted on said brake lever means, and spring means urging said switch operating member into a position of abutment against said abutment means when said brake lever means is in said brake applying position thereof.

No references cited.